United States Patent
Webb et al.

(10) Patent No.: US 8,948,575 B2
(45) Date of Patent: Feb. 3, 2015

(54) SYSTEM AND METHOD FOR PROVIDING DEVICE WITH INTEGRATED TIME CODE GENERATOR, TRANSMITTER, AND READER WITH INTERRUPTIBLE FEEDBACK MONITORING AND TALKBACK

(71) Applicants: Reginald Webb, Chandler, AZ (US); Laurie Webb, Chandler, AZ (US)

(72) Inventors: Reginald Webb, Chandler, AZ (US); Laurie Webb, Chandler, AZ (US)

( * ) Notice: Subject to any disclaimer, the term of this patent is extended or adjusted under 35 U.S.C. 154(b) by 0 days.

(21) Appl. No.: 13/714,269

(22) Filed: Dec. 13, 2012

(65) Prior Publication Data

US 2014/0169768 A1   Jun. 19, 2014

(51) Int. Cl.
| | |
|---|---|
| *H04N 5/78* | (2006.01) |
| *H04N 5/932* | (2006.01) |
| *H04N 5/935* | (2006.01) |
| *H04N 5/7824* | (2006.01) |
| *H04N 5/917* | (2006.01) |
| *H04N 5/92* | (2006.01) |
| *G06F 17/00* | (2006.01) |
| *H04B 3/00* | (2006.01) |

(52) U.S. Cl.
CPC ..................................... *H01N 5/04* (2013.01)
USPC ........... 386/321; 386/200; 386/201; 386/202; 386/318; 386/338; 386/339; 700/94; 381/80; 381/77

(58) Field of Classification Search
USPC ......... 386/200, 201, 202, 318, 321, 338, 339; 700/94; 381/80, 77; 714/6, 20, 48
See application file for complete search history.

(56) References Cited

U.S. PATENT DOCUMENTS

| | | | | |
|---|---|---|---|---|
| 5,929,921 | A * | 7/1999 | Taniguchi et al. | 348/484 |
| 6,831,729 | B1 * | 12/2004 | Davies | 352/3 |
| 7,711,443 | B1 * | 5/2010 | Sanders et al. | 700/94 |
| 2005/0152282 | A1 * | 7/2005 | Lee et al. | 370/252 |

OTHER PUBLICATIONS

User's Manual for ERXI Encrypted Wireless IFB Confidence Monitor Receiver, ZAXCOM, Feb. 2010.*
Owner's Manual for Deva IV & Deva V High Resolution Digital Audio Recorder, ZAXCOM, Aug. 2007.*

* cited by examiner

*Primary Examiner* — Daquan Zhao
(74) *Attorney, Agent, or Firm* — Robert D. Atkins; Patent Law Group: Atkins and Associates, P.C.

(57) ABSTRACT

A time code signal is transmitted. An audio input is provided. An audio signal is received through the audio input. A first time code signal is generated. A value of the first time code signal is displayed on a display. A data stream including the audio signal with the first time code signal superimposed on the audio signal is generated. The data stream is transmitted to a first external device. An interruptible feedback signal is transmitted to the first external device or a second external device. A talkback signal is transmitted between a second external device and a third external device. A second time code signal is received from a second external device and the first time code signal is synchronized with the second time code signal. An interface is provided for noting the value of the first time code signal.

29 Claims, 11 Drawing Sheets

SYSTEM AND METHOD FOR PROVIDING DEVICE WITH INTEGRATED TIME CODE GENERATOR, TRANSMITTER, AND READER WITH INTERRUPTIBLE FEEDBACK MONITORING AND TALKBACK

FIELD OF THE INVENTION

The present invention relates in general to transmitting time code data and, more particularly, to a system and method for providing a device with an integrated time code generator, transmitter, and reader, with interruptible feedback monitoring and talkback.

BACKGROUND OF THE INVENTION

The entertainment industry has become a ubiquitous part of modern society. Movie and television studios commonly spend millions of dollars to produce movies and television shows that the public spends billions of dollars each year to consume. People rely on movie and television media to provide entertainment, but also as a source of current events, popular culture, and even education.

Over time, technology enabling production of movies and television shows has improved dramatically, allowing the entertainment industry to sustain the public's demand for new media. Today, entertainment media can be delivered to consumers through a wide variety of mediums including cable and satellite receivers, personal computers, or mobile devices in electronic communication with wireless data networks. In addition, video and audio can be recorded and delivered to consumers in extremely high definition and with extremely high clarity.

In order to ensure the highest possible quality final product, audio and video are typically recorded separately and then combined into a single product during editing and post-production. In most cases, the device that operates to record high quality video is not the same device that is used to record high quality audio. In other words, for sophisticated movie and television productions, the audio is commonly recorded as a separate data signal from the video. After all, even if an audio recording device were physically attached to or integrated within a camera, on a typical movie or television set the camera operator often cannot position the camera in the ideal location to record dialogue or surrounding sounds while simultaneously filming the environment from the appropriate angle or distance. Furthermore, audio and video are typically recorded from many different perspectives and sources. For example, microphones are often physically attached to each of the actors and also positioned nearby, while cameras are positioned at various distances and angles to capture close-ups of the actors as well as the surrounding environment.

Because of the complexity of recording high quality audio and video, in many cases, movie and television productions employ entirely separate crews to record audio and video. The audio and video crews are then supervised and coordinated by various members of the production crew such as directors, script supervisors, or producers. Audio and video are then edited and combined by editors during the post-production process. The process of ensuring that audio and video are synchronized in the final production can be time-consuming and complicated, which increases production costs. Furthermore, providing communication between members of the production crew during the production process can be complicated to manage and require many different expensive electrical components that must be carried or controlled by members of the production crew.

SUMMARY OF THE INVENTION

A need exists to provide a low cost and convenient integrated time code generator, transmitter, and reader, with interruptible feedback and talkback. Accordingly, in one embodiment, the present invention is a method of transmitting a time code signal comprising the steps of providing an audio input, receiving an audio signal through the audio input, generating a first time code signal, displaying a value of the first time code signal on a display, generating a data stream including the audio signal with the first time code signal superimposed on the audio signal, and transmitting the data stream to a first external device.

In another embodiment, the present invention is a method of transmitting a time code signal comprising the steps of receiving an audio signal through an audio input, generating a first time code signal, generating a data stream including the audio signal with the first time code signal superimposed on the audio signal, and transmitting the data stream to a first external device.

In another embodiment, the present invention is a method of transmitting a time code signal comprising the steps of receiving an audio signal, generating a time code signal, and generating a data stream including the audio signal with the time code signal superimposed on the audio signal.

In another embodiment, the present invention is a time code generating device comprising a signal input for receiving an audio signal from an audio source, a time code generator coupled to the signal input for generating a time code signal, and a signal output coupled to the signal input and time code generator for transmitting a data stream including the audio signal with the time code signal superimposed on the audio signal.

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Since the early days of silent films, where movies were filmed using hand-cranked cameras and lacked any synchronized sound or dialogue, the technology supporting the entertainment industry has evolved significantly. Today, even amateur film makers can produce high definition video and audio recordings using camera systems incorporated into hand-held cellular telephones. Professional television and movie producers, meanwhile, often spend millions of dollars on individual productions in order to produce high quality video and audio using state-of-the-art technology.

A typical movie or television production has a large team of crew members, from producers, directors, script supervisors, set designers, costume designers, camera operators, audio crew members, and many others. A well-run production requires constant communication between members of the production crew in order to ensure recording of video and audio runs smoothly, without having to re-shoot scenes. Coordinating communication between members of the production crew often involves the use of intercoms and transmission of vocal communications to headsets or earpieces worn by the crew members. In addition, certain members of the production crew monitor audio and video feeds during shoots in order to ensure that audio and video are captured according to the mandates of the script and the artistic vision of the director. Wirelessly transmitting communication data and video and audio data to various members of the production crew can monopolize limited available wireless spectrum and create interference between devices. Furthermore, the equipment required to capture and transmit the communication or video and audio data is typically bulky and requires many separate devices that can be unwieldy to manage.

In addition, the practicalities of movie and television production typically require separate teams to record audio and video. In any event, audio and video are typically recorded as separate data signals in order to capture the highest quality audio and video. During post-production and editing, the audio and video are then synchronized and re-combined into a single production. Despite the evolution of technology to support the entertainment industry, one of the tasks that editors face that is easier said than done is synchronizing audio and video recorded during the production process.

Figure 1:
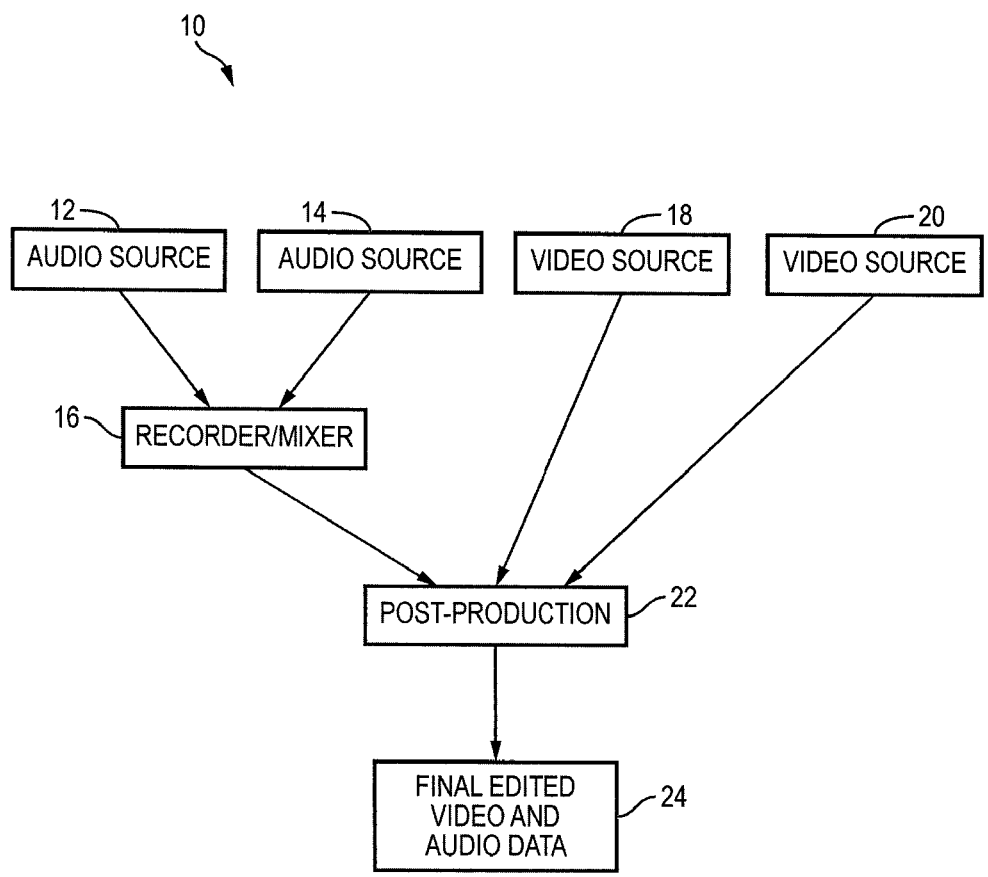
FIG. 1 illustrates a scenario for production and post-production of audio and video recordings.

For example, FIG. 1 illustrates a scenario for production and post-production of audio and video recordings. A production or film is recorded in the field or on film set 10. Film set 10 includes a plurality of audio sources 12 and 14. Audio sources 12 and 14 include microphones attached to actors, subjects of a documentary, interviewers and interviewees, or other people providing dialogue. Alternatively, audio sources 12 and 14 include computer generated sounds or microphones capturing sound effects in the natural environment. Audio sources 12 and 14 are capable of capturing sounds and converting the sounds into electronic signals or audio signals. Audio sources 12 and 14 are electrically connected to recorder/mixer 16, which captures the audio signals from audio sources 12 and 14 and records the audio signals in a fixed medium such as a magnetic tape, hard drive, flash memory, or other mass storage device. In addition, recorder/mixer 16 is capable of adjusting the characteristics of the audio signals from audio sources 12 and 14 and mixing the audio signal into a single mixed audio signal.

In addition, film set 10 includes a plurality of video sources 18 and 20, which may include analog or digital video cameras capable of recording various actors, subjects, or environments. After audio sources 12 and 14, recorder/mixer 16, and video sources 18 and 20 record audio and video during the production process, the audio signals from recorder/mixer 16, and the video from video sources 18 and 20 are edited in post-production process 22. In post-production process 22, various editors, directors, and producers edit and adjust the audio and video according to the script and artistic vision of the post-production team. During post-production process 22, video and audio recorded during production is rearranged or deleted, and additional supplemental audio and video may be added before the final edited video and audio data 24 is released for public consumption.

The process of editing and combining the originally-recorded audio and data files from multiple sources into a single production is complicated. In particular, synchronizing the various audio signals or channels with the various video signals is difficult. One technique that helps with synchronizing audio and video is the use of a time code signal or time code data. A time code signal takes the form of an eight digit twenty-four hour clock. The first and second digits represent hours in the form of a two-digit integer ranging from 0-23 hours per day. The third and fourth digits represent minutes in the form of a two-digit integer ranging from 0-59 minutes per hour. The fifth and sixth digits represent seconds in the form of a two-digit integer ranging from 0-59 seconds per minute. The seventh and eighth digit represent frame in the form of a two-digit integer, the range of which varies depending on geographic region. For example, the standard frame rate in the United States for television productions is approximately 30 frames per second (fps), while the standard frame rate in the United States for film productions is approximately 24 fps. Thus, the seventh and eighth digits of the time code in the United States typically represent a two-digit integer ranging from 0-30 frames per second. By contrast, the standard frame rate in parts of Europe is 25 frames per second. The time code signal or data is generated from a common source and transmitted as a discrete data signal to the recorder/mixer and each video source to be recorded simultaneously as a separate data signal with the audio and video data. In many instances, there are multiple time code sources with one time code source acting as the master, and the other time code sources being synchronized or jammed with the master time code source at the beginning of production or periodically during production. Once recording is completed, the audio data and video data can be synchronized in post-production using the time code signal.

Using multiple time code sources typically requires synchronizing the various time code sources at several points during production to ensure that the time code sources do not fall out of synchronization. Ensuring that the time code signal that is recorded on each device is synchronized can be a cumbersome process. For example, a member of the production crew may have to periodically walk around the set with a master time code generator, to synchronize the master time code generator with each camera or recording device, which is time consuming and often impractical. Alternatively, the output of the master time code generator may be periodically transmitted wirelessly as a separate data signal to each camera, recording device, or time code device, which creates potential interference with other devices and signals (e.g., wireless microphones) transferring data within the limited wireless spectrum available on many production locations. Furthermore, when time code data is transmitted wirelessly, some devices receiving the time code data from the master time code device may lose the wireless connection with the master time code device and therefore lose synchronization with the master time code device.

Typically, the time code generator is carried and controlled by the member of the production crew responsible for recording and/or mixing the audio. The same member of the production crew often also carries many other devices, including the audio recorder and audio mixer, interruptible feedback (IFB) equipment, intercom or talkback equipment, and various other electronic devices or equipment to facilitate the production process. Managing or carrying each separate device can be unwieldy and heavy, and makes the member of the production crew's job more difficult and complicated.

Figure 2:
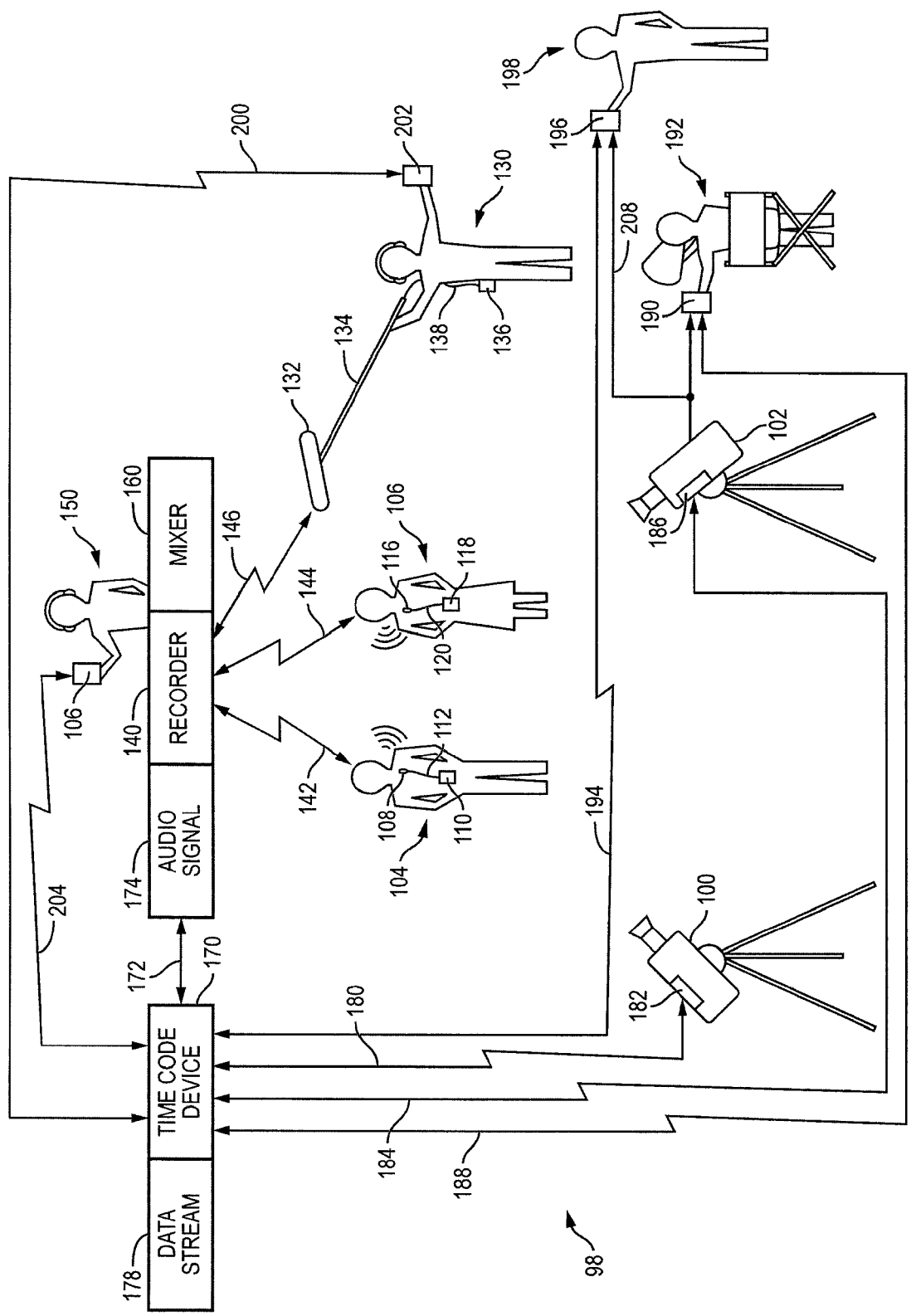
FIG. 2 illustrates a process of transmitting a data stream including an audio signal with a time code signal superimposed on the audio signal.

FIG. 2 illustrates a process of transmitting a data stream including an audio signal with a time code signal superimposed on the audio signal to members of a production crew on film set 98. Film set 98 includes video cameras 100 and 102 and talent 104 and 106. Film set 98 can be the scene of a movie or television production, a documentary film, a theater production, a reality television program, or on location in the field of a news report or in nature. Video camera 100 and video camera 102 record video of talent 104 and 106 engaging in a conversation. Talent 104 and 106 can be actors on a movie or television set, reading lines from a script. Alternatively, talent 104 and 106 may be the subjects of a documentary film or a reality television program.

A microphone 108 is attached to the clothing or body of talent 104. Microphone 108 is in electronic communication with transmitter 110 by way of wire 112. Transmitter 110 includes an internal battery as a power supply and is capable of wirelessly transmitting audio received through microphone 108 to a nearby receiver or recorder unit. Similarly, a microphone 116 is attached to the clothing or body of talent 106. Microphone 116 is in electronic communication with transmitter 118 by way of wire 120. Transmitter 118 includes an internal battery as a power supply and is capable of transmitting audio received through microphone 116 to a nearby receiver or recorder unit.

In addition, boom operator 130 operates boom microphone 132 from a position out of view of cameras 100 and 102. Boom microphone 132 is supported by boom pole 134, which is held by boom operator 130. Boom microphone 132 is capable of receiving audio from the environment surrounding talent 104 and 106 and the voices of talent 104 and 106. Boom operator 130 is mobile and is able to move boom microphone 132 to the appropriate position to record the appropriate interaction according to the script or the interaction between talent 104 and 106. Boom operator 130 carries transmitter 136, which is electrically connected to microphone 132 by way of wire 138. Transmitter 136 includes an internal battery as a power supply and is capable of wirelessly transmitting audio received through microphone 132 to a nearby receiver or recorder unit.

Transmitters 110, 118, and 136 are in electronic communication with recorder 140 by way of communication channels 142, 144, and 146, respectively. Communication channels 142, 144, and 146 are unidirectional or bi-directional and transmit data between recorder 140 and transmitters 110, 118, and 136 in a wireless configuration. As talent 104 and 106 interact and engage with one another, microphones 108, 116, and 132 receive the audio of the surrounding environment and voices of talent 104 and 106, respectively. Transmitters 110, 118, and 136 transmit the audio received by microphones 108, 116, and 132 to recorder 140.

Each of the audio data signals transmitted through communication channels 142, 144, and 146 operate as separate audio channels for subsequent audio mixing. Recorder 140 is an analog or digital recording device, capable of storing the audio signals received from microphones 108, 116, and 132 in a fixed medium such as a magnetic tape, vinyl record, hard drive, flash memory, or other similar mass storage device capable of storing analog or digital data. Recorder 140 is operated by sound mixer 150. Sound mixer 150 is responsible for ensuring that the appropriate sound is recorded from the environment surrounding talent 104 and 106 and making sure that all appropriate dialogue is received from microphones 108 and 116. In addition, sound mixer 150 communicates with boom operator 130 to ensure that boom operator 130 places boom microphone 132 in the appropriate location to capture any necessary audio.

Sound mixer 150 may also be responsible for operating audio mixer 160 and mixing the audio signals recorded by recorder 140. Alternatively, separate individuals may be responsible for mixing and recording the audio signals. Audio mixer 160 is in electronic communication with recorder 140, and in some instances, audio mixer 160 and recorder 140 are combined into a single unit or housing. Audio mixer 160 is capable of receiving the separate audio channels recorded by recorder 140 and combining or mixing the separate audio channels into a single audio signal. The terms audio signal and audio channel are used interchangeably to refer to audio data from a single audio source. Audio mixer 160 is also capable of adjusting various aspects of the separate audio channels during the mixing process, including routing the audio channels to other external devices, or changing the level, timber, or other dynamics of the separate audio channels. In addition to adjusting the various aspects of the audio signals, audio mixer 160 mixes the analog or digital audio signals from the separate audio channels by summing the voltages or digital signals into a single monaural or stereo audio signal.

Recorder 140 and/or mixer 160 are in electronic communication with time code device 170 over communication channel or link 172. Communication channel 172 is bi-directional and transmits data between time code device 170 and recorder 140 and/or mixer 160 in a hard-wired or wireless configuration. Sound mixer 150 can carry time code device 170 or store time code device 170 in a convenient location for easy access.

Time code device 170 receives an audio signal 174 from recorder 140 and/or mixer 160 by way of communication channel 172. Audio signal 174 can be a digital or analog audio signal, and includes the mixed audio signal from mixer 160 or one or more of the audio signals received by recorder 140 over communication channels 142, 144, or 146. As time code device 170 receives audio signal 174 from recorder 140 and/or mixer 160, time code device 170 superimposes time code data on the audio signal 174 to create data stream 178. Thus, data stream 178 includes audio signal 174, which may include one or more separate audio signals or channels, for example, the individual audio signals transmitted over communication channels 142, 144, and 146. Alternatively, audio signal 174 may include the mixed audio signal from mixer 160 as a single audio signal or channel. Data stream 178 is then transferred to other peripheral devices for the purposes of synchronizing the audio signal with video, providing feedback monitoring to members of the production crew, and facilitating communication between members of the production crew.

In particular, data stream 178 is transmitted by way of communication channel 180 to a mobile device 182 in electronic communication with camera 100. Similarly, data stream 178 is transmitted by way of communication channel 184 to a mobile device 186 in electronic communication with camera 102. In addition, data stream 178 is transmitted by way of communication channel 188 to a mobile device 190 operated by director 192. Data stream 178 is also transmitted by way of communication channel 194 to a mobile device 196 operated by script supervisor 198. Data stream 178 is further transmitted by way of communication channel 200 to mobile device 202 operated by boom operator 130. Data stream 178 is also transmitted by way of communication channel 204 to mobile device 206 operated by sound mixer 150. Data stream 178 is also transmitted to any additional members of the production crew who need access to data stream 178.

Communication channels 180, 184, 188, 194, 200 and 204 are bi-directional and transmit data between time code device 170 and the corresponding mobile devices in a wired or wireless configuration. In one embodiment, mobile devices 182, 186, 190, 196, 202, and 206 are time code devices similar to time code device 170 capable of sending and receiving data signals in a wireless configuration. Alternatively, mobile devices 182, 186, 190, 196, 202, and 206 are mobile communication devices such as cellular telephones with advanced computing and connectivity capability (i.e., a smartphone), tablet personal computer, personal digital assistant, or other computer system or electronic device capable of mobile wireless data communication and data processing.

As data stream 178 is transmitted to mobile devices 182, 186, 190, 196, 202, and 206, some or all of the mobile devices may be configured to simultaneously receive a video feed, either directly from one or more cameras, or from a separate video source. For example, director 192 and script supervisor 198 operating mobile devices 190 and 196, respectively, receive a video feed from camera 102. The video feed from camera 102 is transmitted in a wired or wireless configuration by way of communication channel or link 208 to mobile devices 190 and 196, allowing director 192 and script supervisor 198 to monitor audio, video, and time code simultaneously.

Figure 3A:
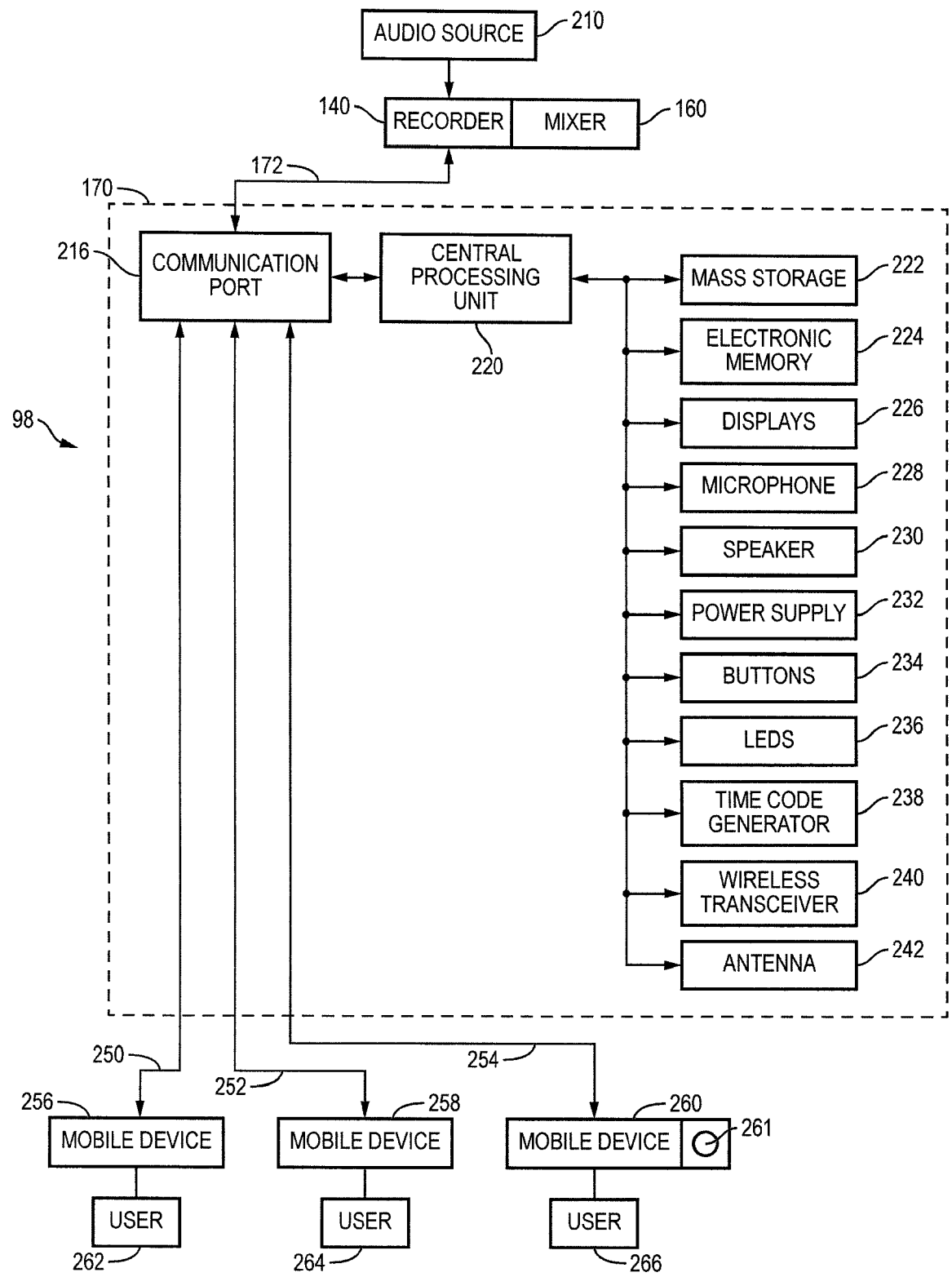
FIGS. 3a-3b illustrate a process of transmitting a data stream using a time code device.
Figure 3B:
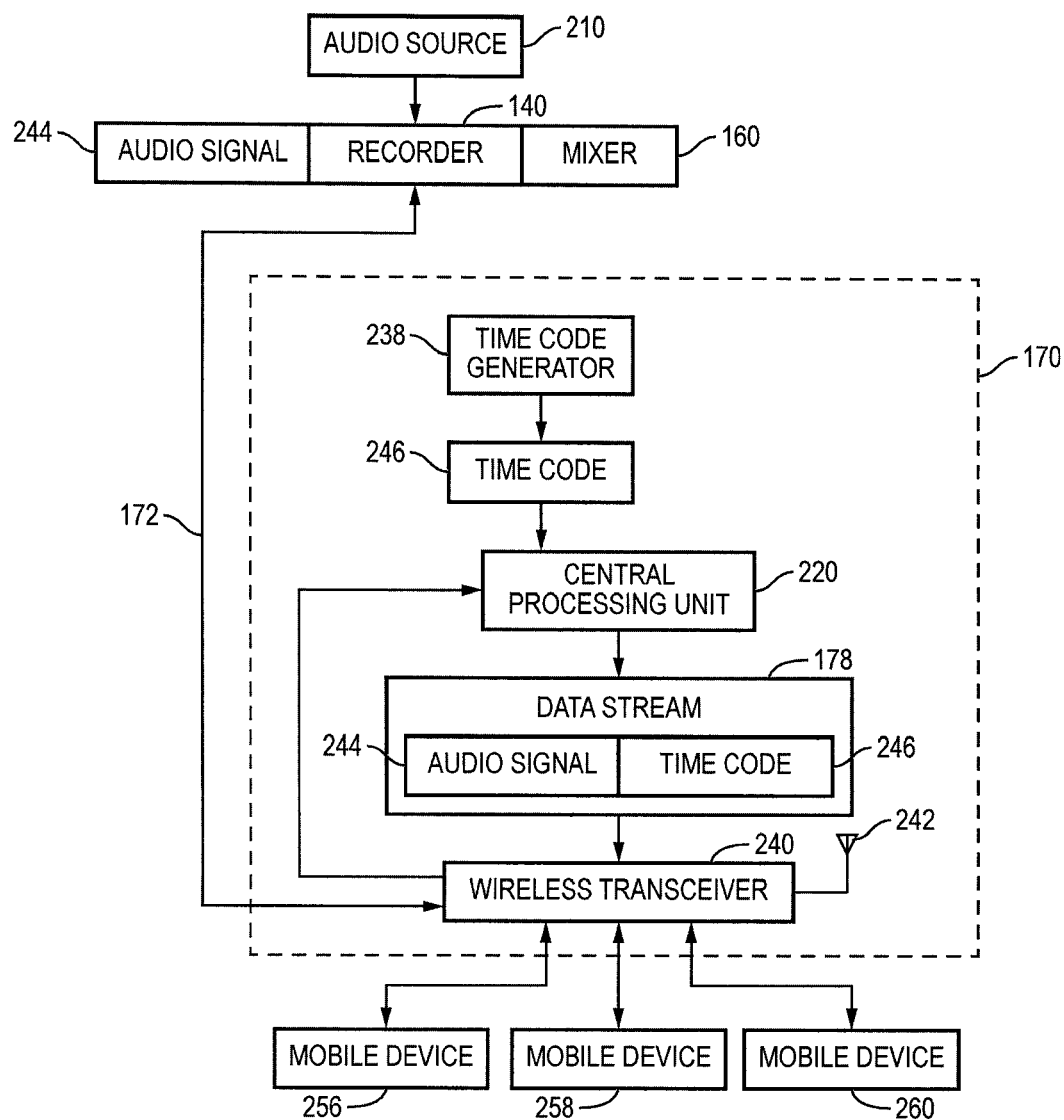

FIGS. 3a-3b illustrate a process of transmitting a data stream using a time code device. Further detail of time code device 170 operating on film set 98 is illustrated in FIG. 3a. Recorder 140 receives an audio signal from audio source 210. The audio signal includes audio captured by a microphone, or pre-generated audio data files that will be incorporated into the final video production. The audio signal is mixed by mixer 160 and transmitted by recorder 140 or mixer 160 to communication port 216 of time code device 170 by way of communication channel 172. Communication port 216 represents one or more electronic communication data ports capable of sending and receiving input and output data to external devices. Communication port 216 is configured to receive and transmit input and output (I/O) data wirelessly, for example, using available electromagnetic spectrum or infrared (IR) signal communication. Alternatively, communication port 216 can be configured to receive I/O data by way of data cables with a wired interface such as high-speed Ethernet, Universal Serial Bus (USB), High-Definition Multimedia Interface (HDMI), tip-ring-sleeve (TRS) connector, or other similar analog or digital data interface. Communication port 216 is electrically connected to central processing unit (CPU) or microprocessor 220 for processing data received by communication port 216 and for transmitting data processed by CPU 220.

Time code device 170 further includes several other components that are controlled by CPU 220. For example, mass storage device or hard disk 222 is electrically connected to CPU 220 for storing data files on non-volatile memory for future access by CPU 220. Mass storage device 222 can be any suitable mass storage device such as a hard disk drive (HDD), flash memory, secure digital (SD) memory card, magnetic tape, compact disk, or digital video disk. Time code device 170 further includes electronic memory 224 for random-access memory (RAM) data storage. One or more displays 226 are positioned externally on time code device 170 to facilitate user interaction with time code device 170. Displays 226 include light-emitting diode (LED) displays, liquid crystal displays (LCD), optical LED (oLED) displays, or other suitable displays capable of graphically displaying information to users.

Time code device 170 further includes microphone 228 and speaker 230 for recording and playback of additional audio. Microphone 228 and speaker 230 may be housed internally or externally with respect to time code device 170. Alternatively, time code device 170 includes an amplifier or preamplifier capable of driving an external speaker.

A power supply 232 is connected to CPU 220 as a power source. Power supply 232 can be house internally or externally with respect to time code device 170 to provide electrical power to time code device 170. For example, power supply 232 may be a removable or rechargeable battery, or an alternating current (AC) or direct current (DC) electrical terminal mounted to a surface of time code device 170 and capable of receiving and converting power from an external source. A plurality of buttons 234 enable user interaction with time code device 170 and displays 226. One or more LED indicators 236 are exposed on the external housing of time code device 170 to communicate information to the user, such as power, battery level, frame rate, or other relevant activity of time code device 170.

Time code device 170 further includes time code generator 238, which is capable of generating a data stream of time code, plus additional user or control data, according to the design and function of time code device 170. For example, the Society of Motion Picture and Television Engineers (SMPTE) time code scheme includes 80 bits of data per frame at a bit rate according to the frame rate of the geographical region. For example, under the United States standard of 30 frames per second, the time code generator generates 2400 bits of data per second (30 frames per second×80 bits per frame), with approximately 30 separate time codes generated per second. Each frame of 80 bits of data includes twenty six bits of data representing time in binary coded decimal which can be converted to an eight digit decimal number representing a twenty-four hour clock. The third and fourth digits represent minutes in the form of a two-digit integer ranging from 0-59 minutes per hour. The fifth and sixth digits represent seconds in the form of a two-digit integer ranging from 0-59 seconds per minute. The seventh and eighth digit represent frame in the form of a two-digit integer, the range of which varies depending on geographic region. For example, the standard frame rate in the United States is approximately 30 frames per second. Thus, the seventh and eighth digits of the time code in the United States typically represent a two-digit integer ranging from 0-30 frames per second. In addition to the time data, the SMPTE scheme includes 32 bits of data designated as user bits, 16 sync word bits, and additional bits for flags and correction bits. Time code device 170 may utilize the SMPTE scheme for encoding time code data, or may alter the SMPTE scheme to include additional or alternative data transmitted as part of the time code data stream.

Wireless transceiver 240 sends and receives analog or digital audio signals, data signals, control signals, and other data to and from external devices through antenna 242 using Wi-Fi Protected Setup (WPS), Wi-Fi Direct, infrared (IR) short-range communication, or other suitable wireless data transfer technology or protocols.

Time code device 170 can be physically located in any location with convenient access by the operator of time code device 170. For example, time code device 170 can be stored in an equipment bag carried by the operator of recorder 140 or mixer 160. Alternatively, time code device 170 may be integrated within another electronic component, such as recorder 140 or mixer 160.

Time code device 170 is connected by way of communication port 216 and communication channel or links 250, 252, and 254 to mobile devices 256, 258, and 260, respectively. Communication channels 250, 252, and 254 are bi-directional and transmit data between communication port 216 of time code device 170 and mobile devices 256, 258, and 260 in a wireless configuration.

Mobile devices 256, 258, and 260 can be configured to have some or all of the components as shown in time code device 170. For example, mobile device 260 includes camera 261, which is integrated into mobile device 260 and electrically connected to the graphical interface and central processing unit of mobile device 260 and is capable of capturing still photographs or video. Mobile devices 256, 258, and 260 can also be time code devices configured to be slaves with respect to the master time code device 170. Thus, each mobile device 256, 258, and 260 may include a time code generator component similar to time code generator 238 of time code device 170 shown in FIG. 3a. The time code generator component of each mobile device 256, 258, and 260 is capable of wirelessly synchronizing with time code generator 238 of time code device 170 and generating a time code signal on its own if communication channels 250, 252, and 254 are broken or lost. Then, once communication channels 250, 252, and 254 are re-established, the time code generator of each mobile device 256, 258, and 260 can re-synchronize with time code generator 238 of time code device 170, thereby allowing the time code signal for each mobile device 256, 258, and 260 to remain synchronized with time code device 170 without requiring a member of the production crew to manually synchronize the time code for each mobile device. Alternatively, mobile devices 256, 258, and 260 can be mobile communication devices such as a cellular telephone with advanced computing and connectivity capability (i.e., a smartphone), tablet personal computer, PDA, or other similar electronic device designed for mobile communication and sophisticated data processing.

Mobile devices 256, 258, and 260 are operated by users 262, 264, and 266, respectively. Users 262, 264, and 266 can include camera operators, sound mixer 150, boom operator 130, director 192, script supervisor 198, or other members of the production crew who need access to the time code and audio signal data.

FIG. 3b illustrates further detail of the process of transmitting a data stream including an audio signal and time code to mobile devices. Central processing unit 220 of time code device 170 receives an audio signal 244 from audio source 210 and recorder 140 or mixer 160 as a digital or analog signal by way of communication channel 172, wireless transceiver 240, and antenna 242. Simultaneously, time code generator 238 continuously generates time code data 246 according to hours, minutes, seconds, and frames, as discussed. Time code data 246 is transmitted to CPU 220, which generates data stream 178. Data stream 178 includes audio signal 244 with time code data 246 superimposed on audio signal 244. Audio signal 244 may be compressed or modified within data stream 178. The user of time code device 170 may adjust the quality of audio signal 244 using the user interface of time code device 170. Data stream 178 is transmitted to wireless transceiver 240 and then to mobile devices 256, 258, and 260 by way of wireless transceiver 240 antenna 242 or a hard-wired configuration. In addition, data stream 178 is transmitted to recorder 140 or mixer 160 by way of communication channel 172, wireless transceiver 240, and antenna 242 to enable recorder 140 or mixer 160 to receive time code data 246.

Transmitting data stream 178 including audio signal 244 with time code data 246 superimposed on audio signal 244 to each mobile device 256, 258, and 260, reduces the amount of data or wireless signals that must be transmitted over limited wireless spectrum, allowing more of the wireless spectrum to be reserved for transmission of audio signals to the recorder. Furthermore, transmitting data stream 178 including audio signal 244 and time code data 246 as a single data stream or channel, rather than transmitting audio signal 244 and time code data 246 as separate data signals or channels, reduces interference between data signals and wireless devices.

Thus, time code device 170 operates to facilitate a method of transmitting a time code signal by providing an audio input in the form of wireless transceiver and antenna 242 or a hard-wired configuration, and receiving an audio signal 244 through the audio input. Time code device 170 further generates a time code signal or time code data 246, and displays a value of the time code signal on a display 226. Time code device 170 generates a data stream 178 including audio signal 244 with a time code signal or time code data 246 superimposed on audio signal 244. Time code device 170 then transmits data stream 178 to an external device, for example, mobile device 256, 258, or 260 by way of wireless transceiver 240 and antenna 242, which operate as a signal output.

Figure 4A:
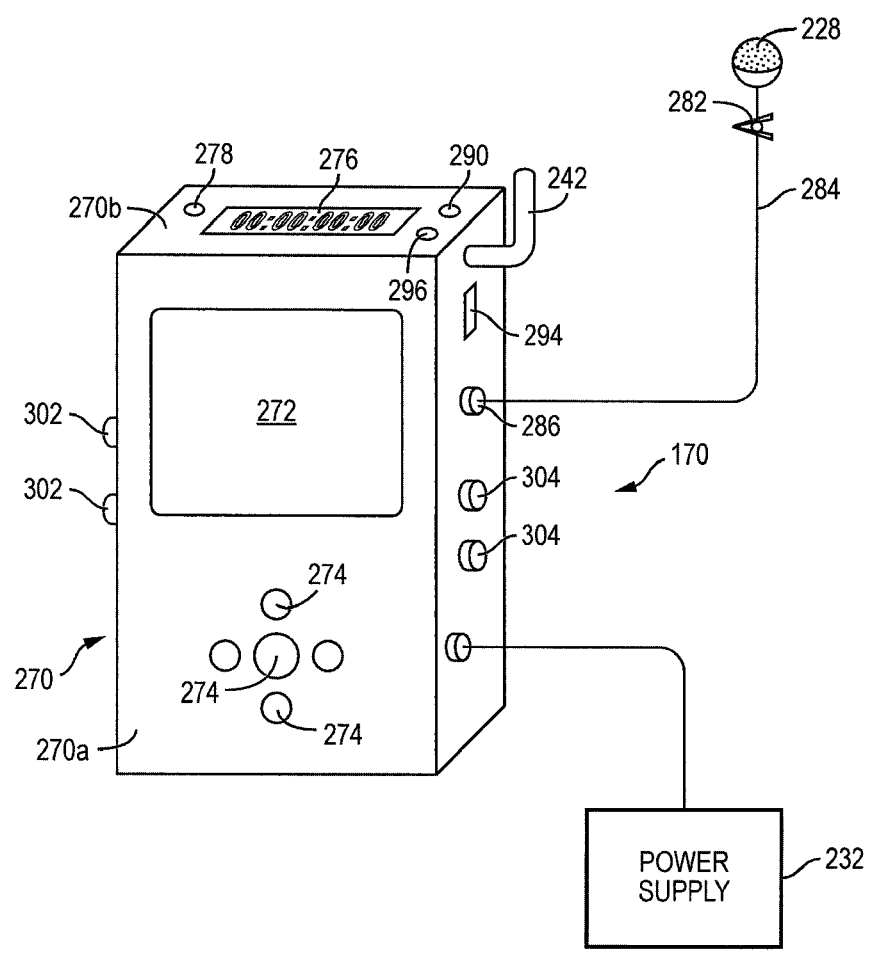
FIGS. 4a-4b illustrate a time code device.

Further detail of time code device 170 is shown in FIG. 4. The components of time code device 170 are contained within housing 270. Housing 270 can be molded plastic or metal, or other suitable material with sufficient strength and durability to protect the components of time code device 170 from damage from the external environment. Time code device 170 includes display 272, which is exposed on a first surface 270a of housing 270. Display 272 can be any suitable display component capable of graphically displaying information for the benefit of a user, such as an LCD, LED display, plasma display, oLED display, or other suitable electronic visual display. Time code device 170 further includes a plurality of interface buttons 274 exposed on first surface 270a for interacting with time code device 170. For example, using interface buttons 274 and display 272, a user may select and modify settings of time code device 170, such as the style of the time code, frame rate, user bits, or any other settings or preferences that the user needs to control.

On a second surface 270b of housing 270, time code device 170 includes a time code display 276 for displaying the time code data. In a common scenario, after a user defines the settings of time code device 170 and activates the time code generator function of time code device 170 using display 272 and interface buttons 274, the user will slip time code device 170 into a bag or box that covers first surface 274a of time code device 170. Second surface 270b is adjacent and perpendicular with respect to first surface 270a, such that if time code device 170 is placed in a box or bag that covers first surface 270a, the top of time code device 170, second surface 270b, can be exposed for convenient physical and visual access. Time code display 276 can be any suitable display capable of displaying integers and other relevant information in the form of time code data, such as an LED display, vacuum fluorescent display (VFD), LCD, plasma display, or other suitable display technology.

In certain scenarios on film set 98, it may be convenient for a camera operator to facilitate synchronizing video and audio during post-production by capturing video of the time code data displayed by time code display 276 prior to filming. In one embodiment, time code display 276 is an LED display to improve visual capture of the time code data by cameras. A power display button 278 enables a user to toggle time code display 276 on and off, such that the time code is only displayed on time code display 276 when necessary to reduce power consumption and heat.

Time code device 170 further includes microphone 228, to enable the operator or user of time code device 170 to dictate and record notes in the form of audio recordings. Microphone 228 can be attached to the clothing or equipment of the user of time code device 170 using clip 282. Alternatively, microphone 228 is mounted on a surface of housing 270. Microphone 228 is electrically connected to CPU 220, shown in FIG. 3a, by way of cable or wire 284 and microphone jack 286.

A record button 290 is positioned on second surface 270b, enabling a user to engage microphone 228 to record an audio signal and store the audio signal as a data file in mass storage 222, shown in FIG. 3a. During production of video and audio, the user of time code device 170 may wish to dictate notes that correspond to the activity during production. For example, if an event occurs during production that the user of time code device 170 believes may need a relevant description (e.g., a vehicle drove by the scene during filming), the user can press record button 290 to describe the event. Alternatively, record button 290 may simply function as a flag associated with a particular time code indicating an event occurred. For example, rather than dictating notes into microphone 228 when an event occurs, the user of time code device 170 may simply press record button 290 to store the time code as a data file in mass storage 222. Each of the flags or audio recordings operates as a notation for the time code signal that can then be analyzed at a later point. For example, during post-production, a member of the production crew may wish to look up the time code for when a vehicle passed by the scene and caused unwanted noise to contaminate the audio or video recording. An editor may wish to review the audio recordings or flags associated with time codes to determine whether a scene needs to be re-shot, or whether environmental noise needs to be removed from the final production. The flag or audio recording can also be transmitted wirelessly to external mobile devices being monitored by the production crew. Thus, microphone 228 and record button 290 operate as an interface for noting the value of a time code signal.

A power switch or button 294 is positioned externally on time code device 170 to enable the user of time code device 170 to power the device on and off. Power supply 232 is also electrically connected to time code device 170, either externally or internally with respect to housing 270 as a power source for time code device 170. For example, power supply 232 may be a removable or rechargeable battery, or an AC or DC electrical terminal mounted to a surface of time code device 170 and capable of receiving and converting power from an external source.

Antenna 242 is mounted either externally or internally with respect to housing 270, and enables wireless transceiver 240, shown in FIG. 3a, to send and receive analog or digital audio signals, data signals, control signals, and other data to and from external devices. In particular, time code device 170 receives audio signals from recorder 140 or mixer 160 and transmits data stream 178 by way of antenna 242 and wireless transceiver 240 to various mobile devices operated by members of the production crew, such as mobile devices 182, 186, 190, 196, 202, and 206.

The process of transmitting data stream 178 to the various mobile devices creates a delay in the audio signal, in particular when the audio is converted from analog to digital and back to analog. Time code device 170 includes indicator light 296, which flashes at the beginning of each frame in order to indicate when the frames change. Prior to beginning the production process, the user of the mobile device uses a camera on the mobile device, for example, camera 261 on mobile device 260, shown in FIG. 3a, to record the flashing indicator light 296 such that the amount of the delay can be known and quantified by the mobile device. For example, assume the process of transmitting data stream 178 from time code device 170 to mobile device 260 creates a delay equivalent to approximately six frames from the time data stream 178 is sent from time code device 170 to the time data stream 178 is received by mobile device 260. Using camera 261 on mobile device 260, the user of mobile device 260 can record indicator light 296 in order to quantify the exact number of frames of delay for the purposes of editing during post-production. Thus, indicator light 296 operates as an external indicator of a frame change for enabling an external device to calibrate a delay in the data stream.

Figure 4B:
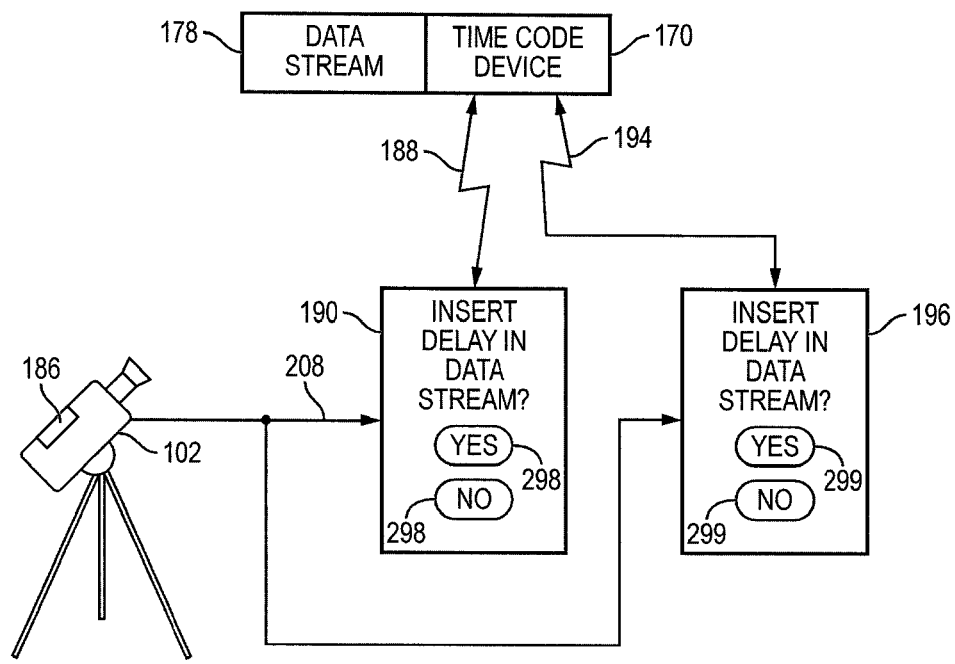

As shown in FIG. 4b, and as discussed with respect to FIG. 2, some mobile devices on film set 98 receive a video feed from a separate video source. For example, mobile devices 190 and 196 receive a video feed from camera 102 by way of communication channel 208. Like data stream 178, the video feed transferred to mobile devices 190 and 196 may have a corresponding delay. The user of mobile devices 190 or 196 can therefore delay data stream 178 using interface buttons 298 and 299 on mobile devices 190 and 196, respectively, to synchronize the video feed transmitted from camera 102 to mobile devices 190 and 196 by way of communication channel 208. Alternatively, the user of time code device 170 may insert a delay in data stream 178 using interface buttons 274 and display 272 of time code device 170 to synchronize the video feed transmitted from camera 102 to mobile devices 190 and 196 by way of communication channel 208.

Returning to FIG. 4a, time code device 170 further includes one or more audio inputs 302 and one or more audio outputs 304 to enable members of the production crew to communicate or talkback to one another using time code device 170. As shown in FIG. 2, mobile device 206, operated by sound mixer 150, is in electronic communication with time code device 170 on film set 98 by way of communication channel 204 with antenna 242 and wireless transceiver 240. Similarly, mobile device 202, operated by boom operator 130, is in electronic communication with time code device 170 on film set 98 by way of communication channel 200 with antenna 242 and wireless transceiver 240.

Figure 5:
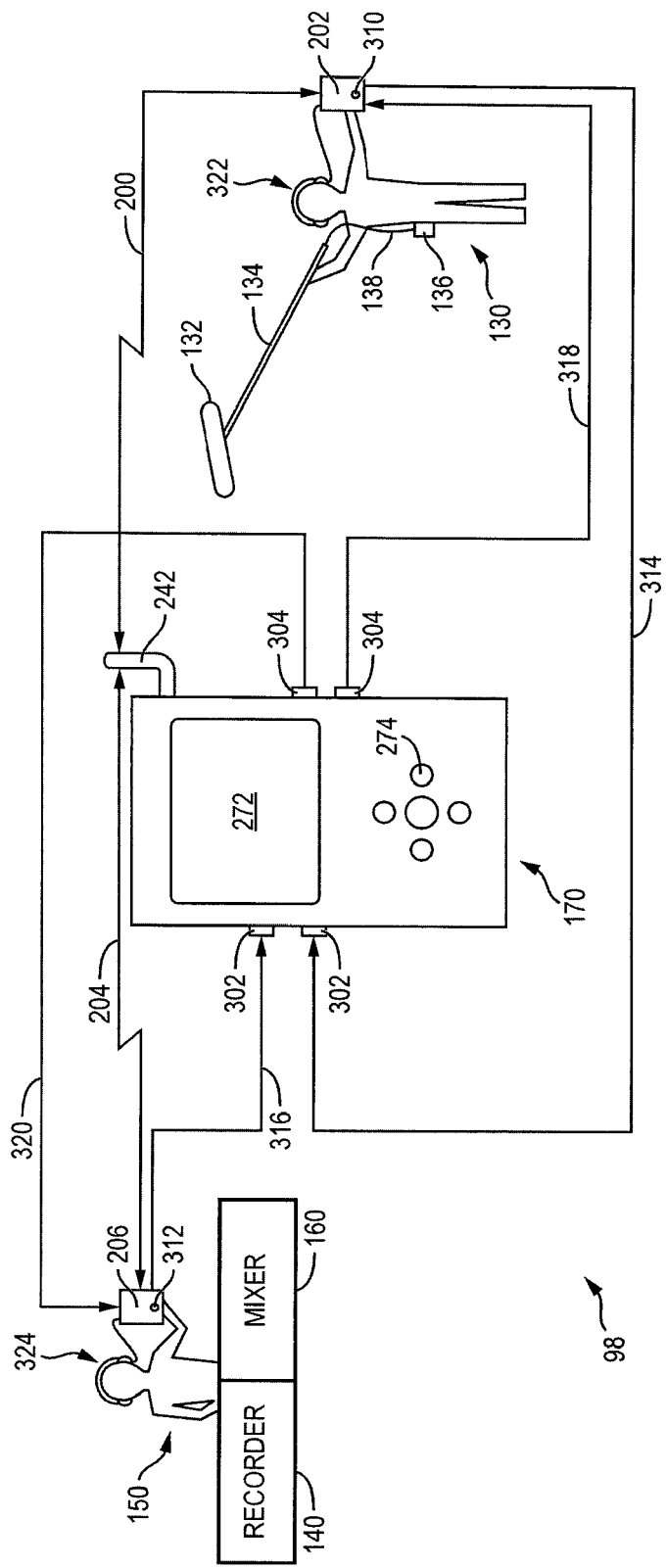
FIG. 5 illustrates a process of transmitting a talkback signal between members of a production crew.

FIG. 5 illustrates a process of transmitting a talkback signal between members of a production crew using time code device 170. During filming of a production on film set 98, sound mixer 150 may need to communicate with boom operator 130, to tell boom operator 130 to focus boom microphone 132 on a particular sound or dialogue. Time code device 170 facilitates communication between boom operator 130 and sound mixer 150 by directly transmitting audio back and forth between sound mixer 150 and boom operator 130.

Mobile device 202 includes an internal or external microphone 310 capable of capturing the audio of verbal communications spoken by boom operator 130. Similarly, mobile device 206 includes an internal or external microphone 312 capable of capturing the audio of verbal communications spoken by sound mixer 150. The audio captured by microphones 310 and 312 is stored as an analog or digital data signal in electronic memory or mass storage within mobile devices 202 and 206, respectively.

Mobile devices 202 and 206 transmit the corresponding audio signal wirelessly by way of communication channels 200 and 204, antenna 242, and wireless transceiver 240 to time code device 170. Alternatively, the data signals captured by microphones 310 and 312 are transmitted as an analog or digital data signal by way of communication channels or links 314 and 316, respectively, to audio input 302 of time code device 170. Communication channels 314 and 316 are unidirectional and transmit data between mobile devices 202 and 206 to time code device 170 in a hard-wired or wireless configuration. Time code device 170 then transmits the audio signal wirelessly by way of communication channels 200 and 204, antenna 242, and wireless transceiver 240 to the intended recipient. Alternatively, time code device 170 transmits the audio signals captured by microphones 310 and 312 by way of communication channels 318 and 320 to the intended recipient.

For example, if the audio signal originated as a vocal communication from sound mixer 150, the audio signal is captured by microphone 312 and transmitted from mobile device 206 by way of communication channel 316 to audio input 302 of time code device 170 and from audio output 304 of time code device 170 to mobile device 202. Boom operator 130 wears headphones 322 connected to an audio output on mobile device 202 to hear the audio signal. By contrast, if the audio signal originated as a vocal communication from boom operator 130, the audio signal is captured by microphone 310 and transmitted from mobile device 202 by way of communication channel 314 to audio input 302 of time code device 170 and from audio output 304 of time code device 170 to mobile device 206. Sound mixer 150 wears headphones 324 connected to an audio output on mobile device 206 to hear the audio signal. In one embodiment, audio input 302 and audio output 304 is a single data connection capable of bi-directional communication. By transmitting the vocal communications between sound mixer 150 and boom operator 130, time code device 170 facilitates talkback communication between members of the production crew. The wireless talkback functionality of time code device 170 avoids the need for expensive and cumbersome equipment, including data cables that can create safety hazards and limit mobility of the production crew. Thus, time code device 170 operates to transmit a talkback signal between external devices such as mobile devices 202 or 206.

Figure 6:
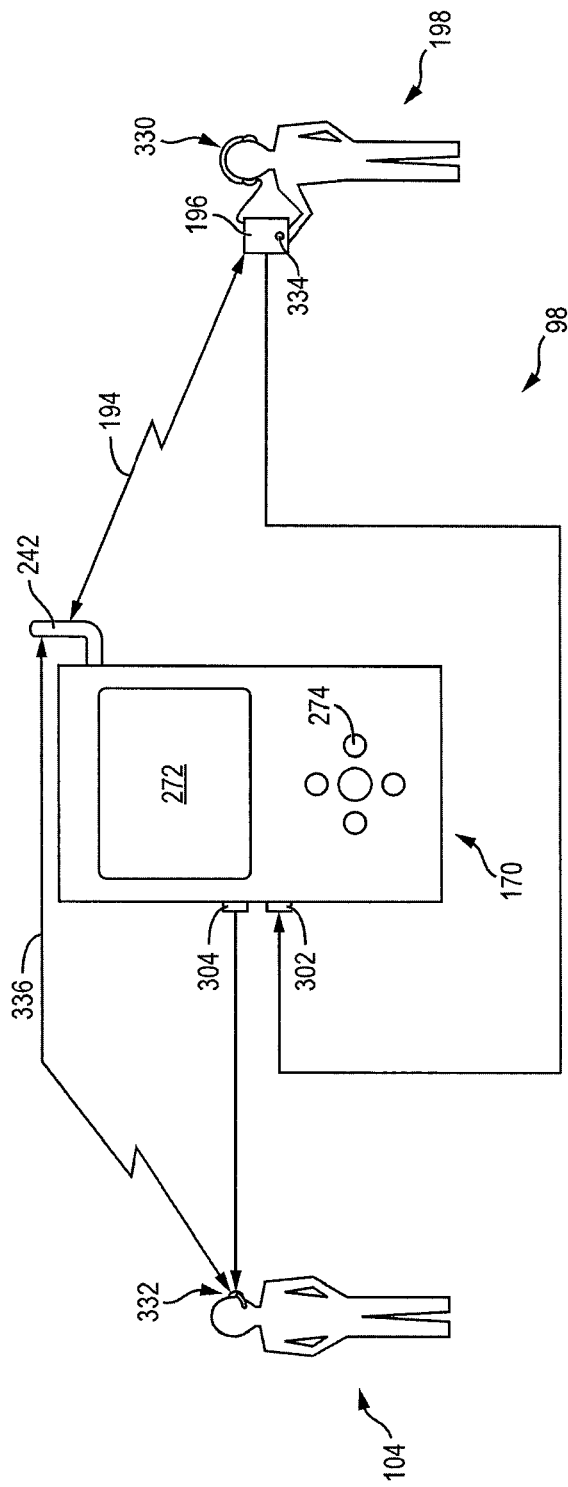
FIG. 6 illustrates a process of transmitting an interruptible foldback or interruptible feedback signal between members of a production crew.

FIG. 6 illustrates a process of transmitting an interruptible foldback (IFB) or interruptible feedback signal between members of a production crew on film set 98. As discussed with reference to FIG. 2, mobile device 196, operated by script supervisor 198, receives data stream 178 from time code device 170 by way of communication channel 194. Script supervisor 198 wears headphones 330 connected to an audio output of mobile device 196 in order to monitor the audio and video during the production. Simultaneously, talent 104 wears earpiece 332, in order to enable talent 104 to have the audio of the production be fed back to talent 104 for the purposes of monitoring. Earpiece 332 is capable of receiving and audibly playing an audio data stream by way of a hard-wired or wireless connection to an external audio source.

For example, earpiece 332 may receive data stream 178 from time code device 170, or may receive a separate audio feed from an external audio source. At some point during the production, script supervisor 198, or another member of the production crew, may need to interrupt the audio feed being sent to earpiece 332 in order to provide some direction to talent 104. For example, script supervisor 198 may need to communicate that cameras are focused on talent 104 or that talent 104 should look in a particular direction. An internal or external microphone 334 is connected to mobile device 196 capable of capturing audio or vocal sounds communicated by script supervisor 198.

An internal or external microphone 334 is connected to mobile device 196 capable of capturing audio or vocal sounds communicated by script supervisor 198. When script supervisor 198 wishes to interrupt the audio feed being sent to earpiece 332, script supervisor 198 speaks into microphone 334. Mobile device 196 transmits the audio signal from microphone 334 by way of communication channel 194, antenna 242, and wireless transceiver 240 to time code device 170. Alternatively, the audio signal from microphone 334 is transmitted to time code device 170 in a hard-wired configuration to an audio input 302, shown in FIG. 5. The audio signal is then transmitted to earpiece 332 in a hard-wired or wireless configuration by way of audio output 304, or transmitted by way of communication channel or link 336, wireless transceiver 240, and antenna 242, to earpiece 332. The audio feed of the production is interrupted or stopped temporarily, and the signal from microphone 334 is played through earpiece 332.

After transmission of the audio signal from microphone 334, the audio feed of the production resumes and talent 104 can continue to monitor the audio feed. Accordingly, time code device 170 operates to transmit an IFB signal between external devices such as earpiece 332 or mobile device 196. Integrating the ability to transmit an IFB signal to an external device into time code device 170 reduces the number of components and devices that the production crew must manage during a production and allows communication between members of the production crew to be localized in a single device, which reduces the complexity of the production.

Figure 7:
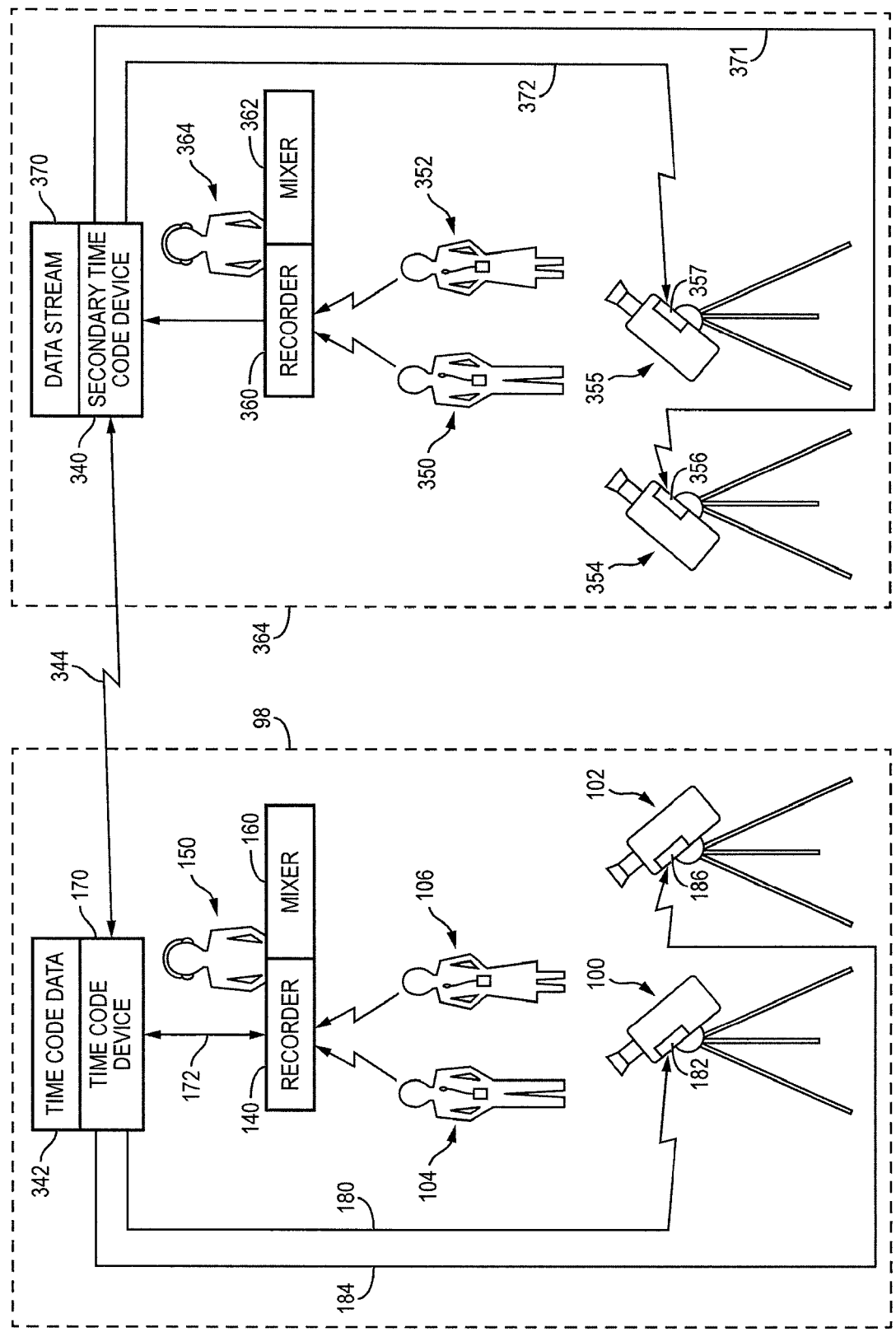
FIG. 7 illustrates a process of reading a time code signal to synchronize two time code devices.

FIG. 7 illustrates a process of reading a time code signal to synchronize two time code devices. A second time code device 340 is capable of acting as a time code reader and synchronizing with time code device 170. Time code device 170, operating on film set 98 receives audio signal 174 from recorder 140 or mixer 160 by way of communication channel 172, and transmits data stream 178 to mobile devices 182 and 186 on cameras 100 and 102 by way of communication channels 180 and 184, respectively, as shown in FIG. 2. In addition, time code device 170 transmits time code data 342 generated by time code device 170, or data stream 178 shown in FIG. 2, to secondary time code device 340 by way of communication channel or link 344. Communication channel 344 is bi-directional and transmits data between time code device 170 and secondary time code device 340 in a hard-wired or wireless configuration.

Secondary time code device 340 is located on film set 346 in a separate physical location from film set 98. For example, during production of a reality television show, talent 104 and 106 engage in a conversation on film set 98, which is filmed by cameras 100 and 102, and the audio is recorded by recorder 140. Meanwhile, in a separate room or building on film set 346, talent 350 and 352 engage in a conversation that is filmed by cameras 354 and 355, with mobile devices 356 and 357 in electrical communication with cameras 354 and 355, respectively, similar to the configuration of cameras 100 and 102 and mobile devices 182 and 186 described with respect to FIG. 2. The audio signal from film set 346 is recorded by recorder 360 and mixer 362, which are operated by recorder operator 364. The audio signal from film set 346 is then transmitted to secondary time code device 340, as described with reference to film set 98 in FIG. 2. Time code data 342, or data stream 178, from time code device 170 is transmitted to secondary time code device 340, and secondary time code device 340 synchronizes the internal time code generator with time code data 342 or data stream 178 or alternatively adopts time code data 342 as the time code data. Secondary time code device 340 in turn generates data stream 370, including the audio stream received from recorder 360 or mixer 362 with time code data superimposed on the audio stream. Data stream 370 is then transmitted to mobile devices 356 and 357 by way of communication channels or links 371 or 372, respectively.

Synchronizing the time code of time code device 170 with the time code of secondary time code device 340, enables the corresponding data stream 178 and 370 to be synchronized without requiring each mobile device within film set 346 to receive data stream 178 or time code data 342 directly from time code device 170. After all, in many circumstances, mobile devices within film set 346 may be outside the necessary proximity to time code device 170. In one embodiment, the range for wireless communication with time code device 170 is less than 400 feet. Any device that is outside the range for wireless communication will be unable to receive time code data from time code device 170, which may otherwise require a member of the production crew to manually synchronize time code device 170 with other devices by physically moving the location of time code device 170. Because mobile devices within film set 346 receive time code data from secondary time code device 340, which is synchronized with time code device 170 and can accurately and reliably generate time code data after leaving the range for communication with time code device 170, the mobile devices within film set 346 receive accurate time code data without requiring a member of the production crew to manually and regularly synchronize the time code data. Furthermore, transmitting time code data 342 directly to secondary time code device 340, rather than directly to each mobile device within film set 346, reduces the amount of data that must be transmitted between film sets 98 and 346. Thus, secondary time code device 340 operates to receive a time code signal or time code data 342 from an external device, time code device 170, and synchronize the time code signal or data of secondary time code device 340 with time code data 342.

Figure 8:
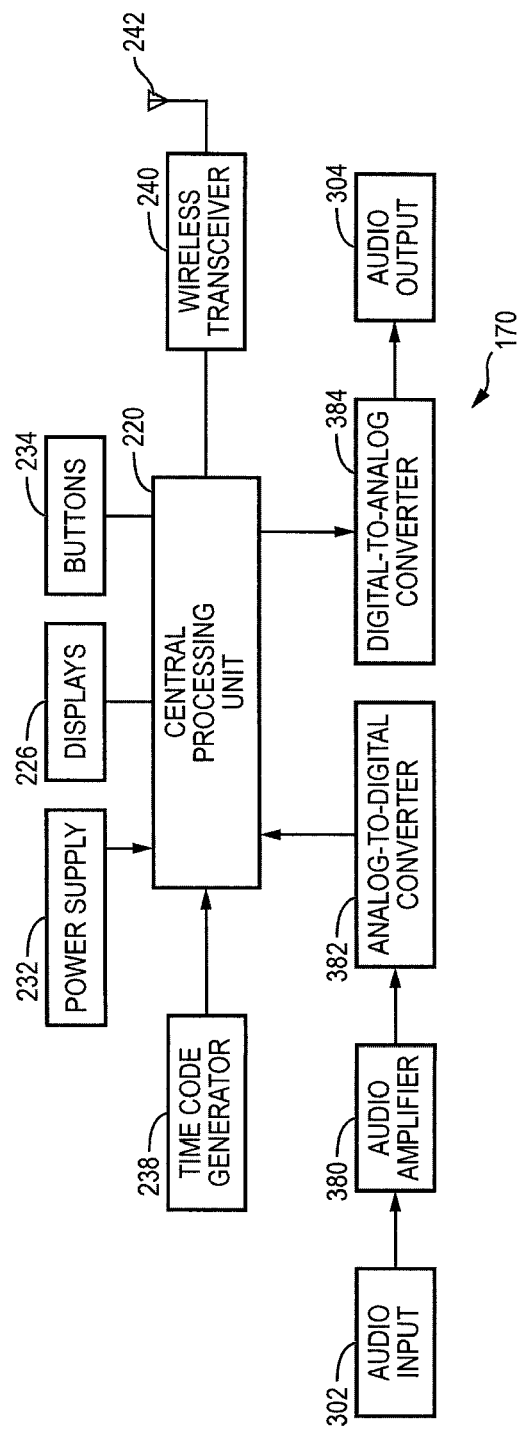
FIG. 8 is a block diagram of the signal processing of the time code device.

FIG. 8 is a block diagram of the signal processing components of time code device 170 and illustrates further detail of time code device 170. CPU 220 is in electronic communication with displays 226 and buttons 234 to enable user interaction with time code device 170. Power supply 232 is also electrically connected to time code device 170, either externally or internally, as a power source for time code device 170. CPU 220 receives time code data from time code generator 238, and an audio signal through wireless transceiver 240 and antenna 242. Alternatively, CPU 220 receives an audio signal from a hard-wired audio input connection.

Time code device 170 further includes audio input 302 and audio output 304 to enable talkback and IFB communication between members of the production crew. A first member of the production crew provides vocal direction to a second member of the production crew, which is captured by a microphone in electrical communication with a mobile device operated by the first member of the production crew, as illustrated in FIGS. 5 and 6, and transmitted to audio input 302. The audio signal received by audio input 302 is amplified by audio amplifier 380 and the analog signal is converted to a digital audio signal with analog-to-digital converter 382 and transmitted to CPU 220. CPU 220 then transmits the digital audio signal to an analog signal with digital-to-analog converter 384 and transmitted to the second member of the production crew by way of audio output 304. In one embodiment, audio input 302 and audio output 304 are integrated as a single connection or jack capable of bi-directional data transmission.

Accordingly, time code device 170 operates as a time code generator, capable of generating a data stream including an audio signal with time code data superimposed on the audio signal. Time code device 170 further functions as a time code reader capable of synchronizing time code data with a second time code device. Time code device 170 further enables talkback and IFB communication between members of a production crew.

Figure 9A:
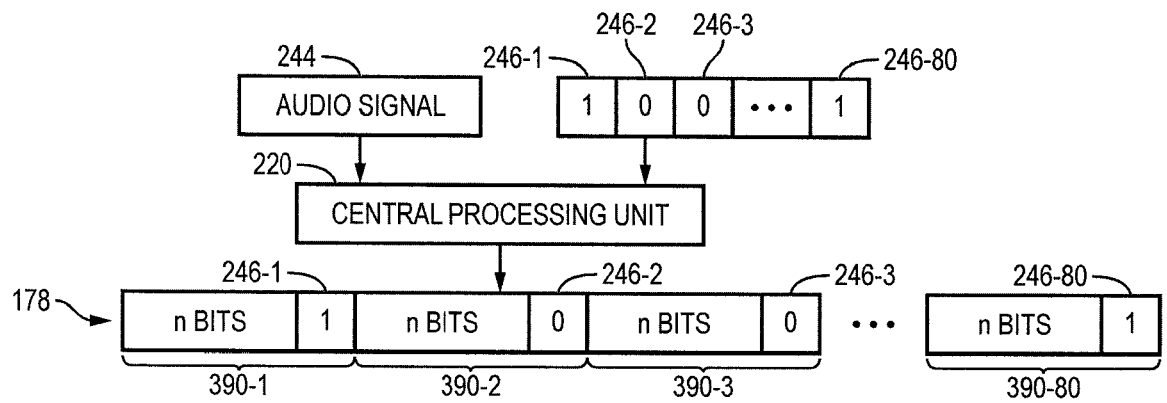
FIGS. 9a-9d illustrate a process of generating a data stream including an audio signal with a time code signal superimposed on the audio signal.

FIGS. 9a-9d illustrate the process of generating data stream 178 including an audio signal with a time code signal superimposed on the audio signal. As shown in FIG. 9a, and as discussed with respect to FIG. 3b, CPU 220 receives time code data 246 from time code generator 238 and audio signal 244 from audio source 210. In the present example, time code data 246 is represented by 80 bits of data, 246-1 through 246-80, to complete an entire time code for each frame. The number of bits of data included in time code data 246 can vary according to the design and function of time code device 170.

CPU 220 combines time code data 246 with audio signal 244, by combining a portion of audio signal 244 with a single bit of time code data 246 into individual data packets 390-1 through 390-80 per frame. Each data packet 390-1 through 390-80 is arranged sequentially to form data stream 178. Each data packet 390-1 through 390-80 includes a single bit of time code data 246. In another embodiment, the number of bits of time code data is greater than one bit according to the design and function of time code device 170. In the example shown, the number of bits of data for the audio signal for each packet 390-1 through 390-80 can vary from 1 to n bits, where n is an integer greater than 1, according to the design and function of time code device 170 and the desired audio quality and available data transfer rates. Thus, generating data stream 178 includes generating a plurality of data packets 390-1 through 390-80, with each data packet 390-1 through 390-80 including a portion of audio signal 244 and a portion of time code data or signal 246.

Data stream 178, including audio signal 244 and time code data 246, is transmitted to each receiving device with time code data 246 superimposed on audio signal 244, as shown in FIG. 9a, by way of wireless transceiver 240 and antenna 242. After data stream 178 is transmitted to the appropriate destination receiving device (e.g., mobile devices within film set 98), time code data 246 is parsed or isolated from data stream 178 by the receiving device to re-create time code data 246.

Figure 9B:
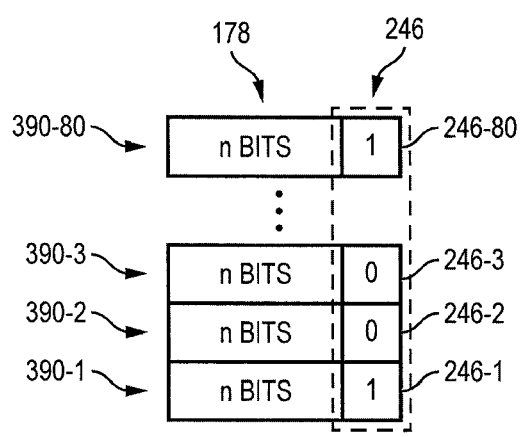
Figure 9C:
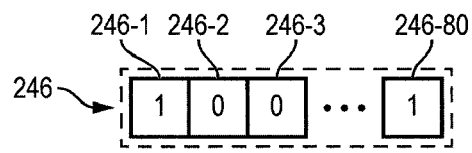

Each bit of time code data 246-1 through 246-80 can be identified and isolated within data packets 390-1 through 390-80 in order to re-create a digital data stream of time code data 246. Visually, if each data packet 390-1 through 390-80 is stacked vertically, as shown in FIG. 9b, the final bit of each packet is identified as constituting a portion of time code data 246. The arrangement of the bit of data in each data packet that holds the bit of time code data can vary according to the design and function of time code device 170. The bit of time code data from each data packet 390-1 through 390-80 can then be isolated and re-combined to re-create a data stream of time code data 246, as shown in FIG. 9c.

Figure 9D:
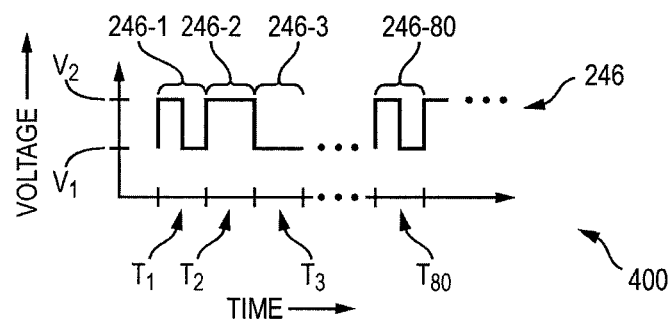

Time code data 246 can also be transmitted as a digital signal from time code device 170 to an external device that needs to receive time code data 246 by way of wireless transceiver 240 and antenna 242. In instances where time code data 246 is transmitted as a separate signal that is not superimposed on the audio signal, time code data 246 may be transmitted using a bi-phase mark scheme, as illustrated by waveform 400 in FIG. 9d. For the data stream of time code data 246, each bit of time code data 246 is a binary digit 0 or 1, which can be conveyed in a data stream by transitioning the voltage between a first voltage V1 and a second voltage V2 during a series of bit periods T1-T80, or a pre-defined time period for each bit. The binary value of 0 or 1 can be represented using a bi-phase mark scheme, as illustrated in FIG. 9d, such that each binary value of 1 is represented by two transitions between V1 and V2 during the bit period, and each binary value of 0 is represented by one transition between V1 and V2 during the bit period. For example, bits 246-1, 246-2, 246-3, and 246-80 can have the value 1, 0, 0, and 1, as shown in FIGS. 9a-9c, which correspond to the bi-phase mark scheme illustrated in FIG. 9d. Bit 246-1 of time code data 246 has a value of 1, as shown by the voltage of time code data 246 transitioning twice between voltages V1 and V2 during bit period T1. Bit 246-2 of time code data 246 has a value of 0, as shown by the voltage of time code data 246 transitioning only once between voltages V1 and V2 during bit period T2. Bit 246-3 of time code data 246 has a value of 0, as shown by the voltage of time code data 246 transitioning only once between voltages V1 and V2 during bit period T3. Bit 246-80 of time code data 246 has a value of 1, as shown by the voltage of time code data 246 transitioning twice between voltages V1 and V2 during bit period T80. In another embodiment, the value of each bit is represented by the voltage of the time code data 246, such that a 1 is represented by voltage V2, and a 0 is represented by voltage V1. The modulation scheme for transmitting time code data 246 can vary according to the design and function of time code device 170. At the end of bit period T80, time code data 246 has completed an entire time code for a single frame.

Thus, CPU 220 is able to produce data stream 178 including audio signal 244 with time code data 246 superimposed or integrated on audio signal 244. Superimposing or integrating time code data 246 onto audio signal 244 within data stream 178 enables the audio signal and time code data to be transmitted as a single data stream. Transmitting the audio signal and time code data as a single data stream reduces the number of signals that must be transmitted wirelessly, thereby reducing interference with other wireless devices within film set 98, and reserving the available wireless data transfer spectrum for use by other wireless devices.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method of transmitting a time code signal, comprising:
   transmitting a plurality of audio signals from a plurality of microphones to an audio recorder;
   recording the plurality of audio signals with the audio recorder;
   creating a mixed audio signal including the plurality of audio signals using an audio mixer, wherein the mixed audio signal includes a plurality of digital samples;
   transmitting the mixed audio signal to a time code device;
   generating a first time code signal including a plurality of bits using the time code device;
   displaying a value of the first time code signal on the time code device;
   generating a data stream by superimposing the first time code signal onto the mixed audio signal using the time code device, wherein each bit of the time code signal replaces a bit of a different digital sample of the mixed audio signal;
   transmitting the data stream to a first external device;
   recreating the first time code signal in the first external device by identifying and isolating the bits of the first time code signal from the data stream;
   displaying a value of the first time code signal on the first external device; and
   using the first external device to play the mixed audio signal portion of the data stream.

2. The method of claim 1, further including transmitting an interruptible feedback signal to the first external device from a second external device using the time code device.

3. The method of claim 1, further including transmitting a talkback signal between a second external device and a third external device using the time code device.

4. The method of claim 1, further including:
   transmitting a second time code signal from a second external device to the time code device; and
   synchronizing the first time code signal with the second time code signal.

5. The method of claim 1, further including providing an external indicator of a frame change to enable a second external device to calibrate a delay in the data stream.

6. The method of claim 1, further including providing an interface for dictating and recording a note relative to a value of the first time code signal.

7. The method of claim 1, wherein the data stream includes a control signal.

8. A method of transmitting a time code signal, comprising:
   transmitting an audio signal to an audio recorder, wherein the audio signal includes a plurality of digital samples;
   recording the audio signal with the audio recorder;
   transmitting the audio signal from the audio recorder to a time code device;
   generating a first time code signal including a plurality of bits using the time code device;
   generating a data stream by superimposing the first time code signal onto the audio signal using the time code device, wherein each bit of the time code signal replaces a bit of a different digital sample of the audio signal;
   transmitting the data stream to a first external device; and
   recreating the first time code signal in the first external device by identifying and isolating the bits of the first time code signal from the data stream.

9. The method of claim 8, further including displaying a value of the first time code signal on the first external device.

10. The method of claim 8, wherein generating the data stream further includes generating a plurality of data packets with each data packet including a digital sample of the audio signal and a bit of the first time code signal.

11. The method of claim 8, further including transmitting an interruptible feedback signal to the first external device from the time code device.

12. The method of claim 8, further including transmitting a talkback signal between a second external device and a third external device using the time code device.

13. The method of claim 8, further including:
   receiving a second time code signal from a second external device; and
   synchronizing the first time code signal with the second time code signal.

14. The method of claim 8, further including delaying the data stream to synchronize the data stream with a video feed.

15. The method of claim 8, wherein the data stream includes a control signal.

16. A method of transmitting a time code signal, comprising:
   providing an audio signal including a plurality of digital samples;
   providing a time code signal including a plurality of bits; and generating a data stream including the time code signal superimposed on the audio signal, wherein each bit of the time code signal replaces a bit of a different digital sample of the audio signal.

17. The method of claim 16, further including transmitting the data stream to a first external device.

18. The method of claim 16, further including displaying a value of the time code signal.

19. The method of claim 16, further including transmitting an interruptible feedback signal to a first external device.

20. The method of claim 16, further including transmitting a talkback signal between a first external device and a second external device.

21. The method of claim 16, wherein generating the data stream further includes generating a plurality of data packets with each data packet including a portion of the audio signal and a portion of the time code signal.

22. The method of claim 16, further including providing an interface for dictating a note corresponding to an activity or event.

23. The method of claim 16, wherein the data stream includes a control signal.

24. A time code generating device, comprising:
a signal input for receiving an audio signal;
a time code generator for generating a time code signal; and
a signal output coupled to the signal input and time code generator for transmitting a data stream including the time code signal superimposed on the audio signal, wherein each bit of the time code signal replaces a bit of a different digital sample of the audio signal.

25. The time code generating device of claim 24, further including a central processing unit coupled to the signal input and time code generator for generating the data stream.

26. The time code generating device of claim 24, further including a display coupled to the time code generator for displaying a value of the time code signal.

27. The time code generating device of claim 24, wherein the time code generating device provides an interruptible feedback signal to an external device.

28. The time code generating device of claim 24, wherein the time code generating device provides a talkback signal between a first external device and a second external device.

29. The time code generating device of claim 24, wherein the data stream includes a control signal.

\* \* \* \* \*